Dec. 29, 1970  J. D. ENSIGN  3,550,448
ELECTRIC THERMOMETER UNIT
Filed Nov. 27, 1968  2 Sheets-Sheet 1
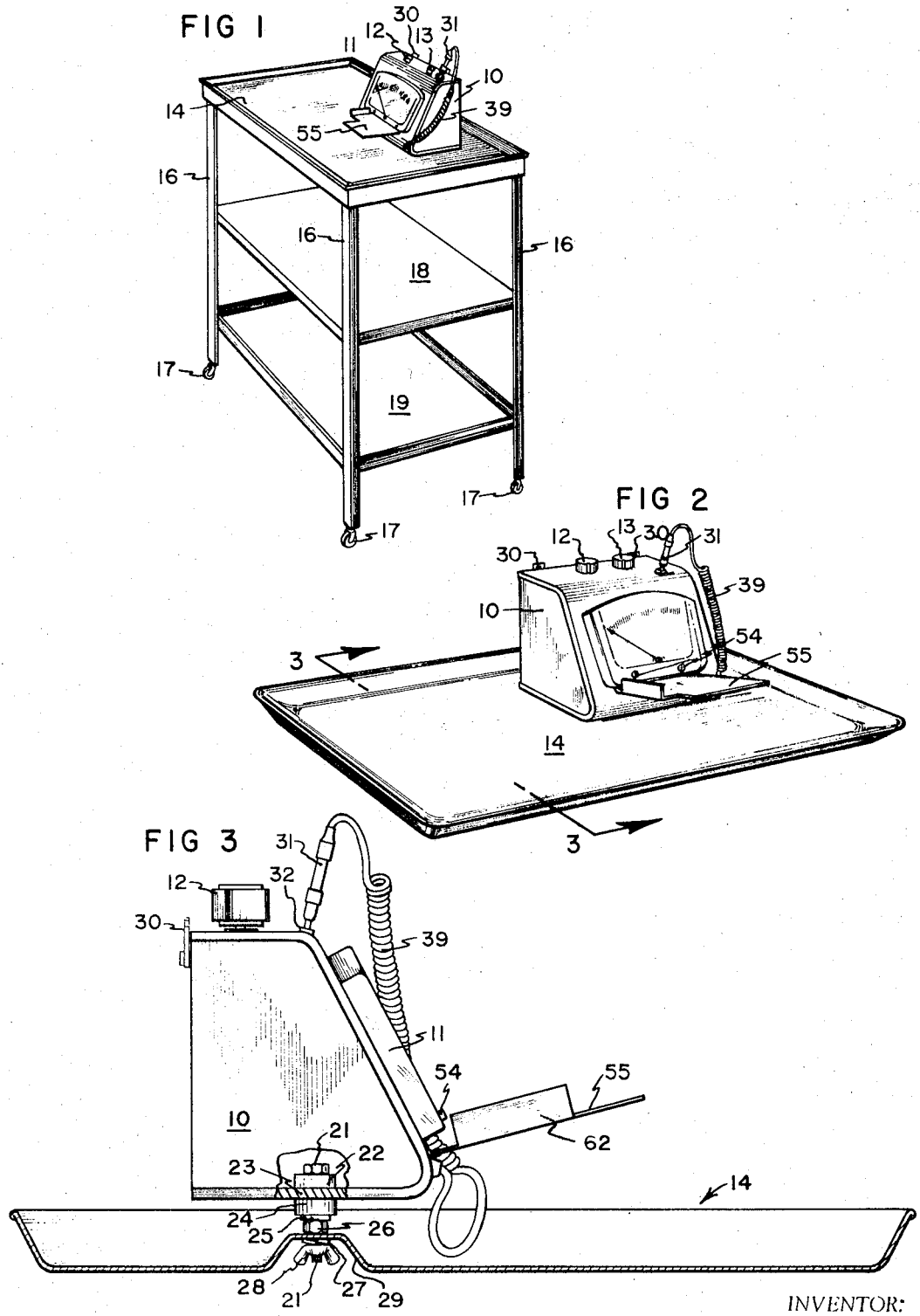
INVENTOR:
JOHN D. ENSIGN
BY:
ATTORNEY Dec. 29, 1970  J. D. ENSIGN  3,550,448
ELECTRIC THERMOMETER UNIT
Filed Nov. 27, 1968  2 Sheets-Sheet 2
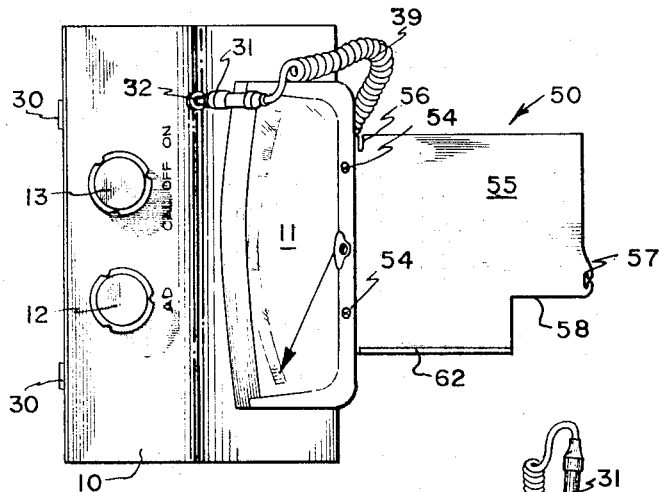
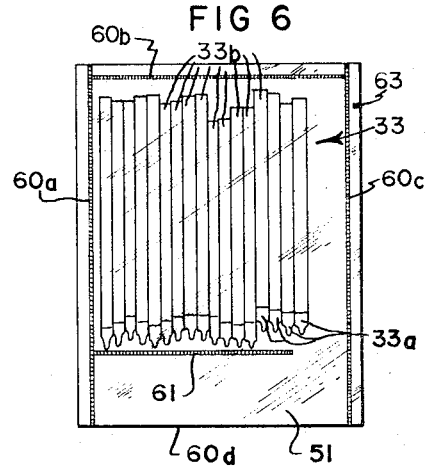
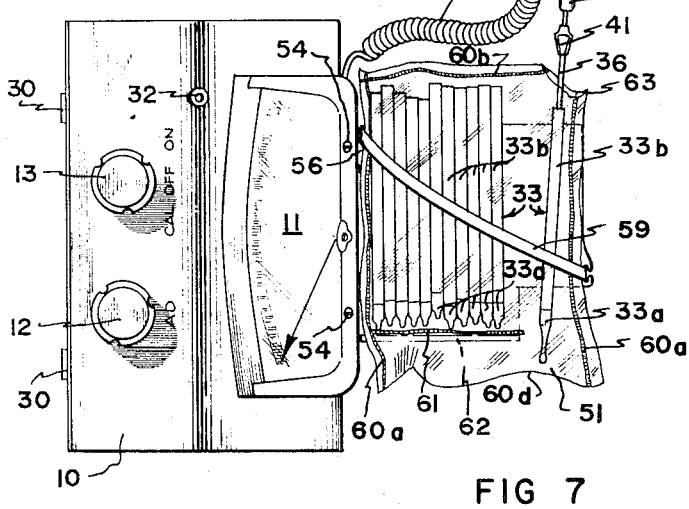
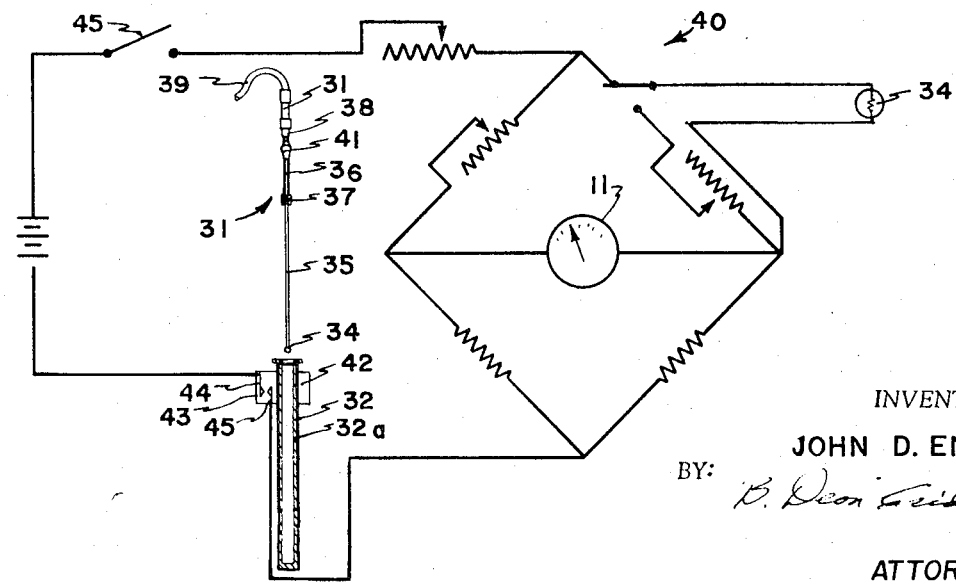
INVENTOR:
JOHN D. ENSIGN
BY:
ATTORNEY United States Patent Office 3,550,448
Patented Dec. 29, 1970

3,550,448
ELECTRONIC THERMOMETER UNIT
John D. Ensign, Brigham City, Utah, assignor to Measurement Science Corporation, Brigham City, Utah, a corporation of Utah
Filed Nov. 27, 1968, Ser. No. 779,369
Int. Cl. G01k *1/08, 1/14, 7/24*
U.S. Cl. 73—343            11 Claims

ABSTRACT OF THE DISCLOSURE

An electronic thermometer is mounted to swivel on a tray and carries a sanitary sheath bag holder constructed to turn with the thermometer and to allow a temperature sensing probe of the thermometer to be inserted into a sheath while the sheath is still in its protective bag and to be withdrawn with the sheath in place, ready for use without its having been touched or otherwise subjected to possible contamination.

BRIEF DESCRIPTION

This invention relates to electronic thermometers, and especially to those that are not frequently moved or that are intended for use within a confined area such as a hospital. Such thermometers, while desirably affording some degree of mobility, do not need to be compact enough to be hand held or to have unlimited portability. Thus, they can be larger and easier to read than those intended to be highly mobile. It has been found desirable in such an electronic thermometer to make it capable of automatically determining a sensed temperature, without operation of any controls or switches and merely by placement of a probe of the thermometer and to be able to place a protective disposable sheath on the thermometer probe in such a manner that the sheath is protected against contamination.

In my co-pending application for U.S. patent, Ser. No. 662,068, filed Aug. 21, 1967 and entitled "Temperature Sensing Probe," I disclosed a probe for electronic thermometers, having a sliding sheath retainer that allows for testing of the sheath as it is installed to thereby minimize sheath rupturing during use. This probe greatly reduces the number of times the probe must be sterilized, but there has not heretofore been available any means for protecting the sheath against contamination as it is gripped during installation.

Principal objects of the present invention are to provide a thermometer having a housing that is adapted to be either semi-permanently wall mounted or to be swivel mounted on the top surface of a tray that is adapted to either be hand carried or to form the top of a roll-around unit. Another object is to provide a housing with a probe receptacle provided therein to receive the probe when the unit is not is use, to automatically switch off the circuit to the probe when the probe is inserted, and to switch on the circuit to thereby place the unit in operating condition when the probe is removed from the receptacle.

Still another object is to provide an electronic thermometer unit having means for supporting bags of disposable probe sheaths in such a manner that the sheaths can be installed on the probe of the thermometer without being touched or contaminated in any other manner.

Principal features of the invention include hooks on the back and a swivel mounting on the bottom of an electronic thermometer housing; a receptacle in the housing that contains a normally closed magnetic field responsive switch of the thermometer circuit and that is adapted to receive the probe of the thermometer, thereby opening the magnetic switch; and a bag holder that is fixed to the thermometer and extends therefrom to releaseably hold a bag or probe sheaths such that a user can individually hold the sheaths, through the bag, while the probe is inserted therein and the sheath is tested, as is fully described in my aforementioned application, Ser. No. 662,068. Thereafter the probe, with the sheath secured thereon, can be withdrawn, and can be used to sense temperatures.

Additional objects and features of the invention will become apparent from the following detailed specification and drawings, disclosing what is presently contemplated as being the best mode of carrying out the invention.

THE DRAWINGS

FIG. 1 is a perspective view of a unit of the invention, with the probe shown as being inserted into a receptacle in the thermometer housing and mounted on a tray that forms the top of a roll around unit; and FIG. 2, similar view of a unit of the invention mounted on a hand carried trap;

FIG. 3, an enlarged vertical section, taken on the line 3—3 of FIG. 2;

FIG. 4, a top plan view of the thermometer housing and sheath package support;

FIG. 5, a view like FIG. 4, but showing a sheath package in place on the sheath package support;

FIG. 6, an enlarged, top plan view of a sheath package; and

FIG. 7, a schematic circuit diagram of the thermometer and showing the receptacle in the housing that is adapted to receive a thermometer probe.

DETAILED DESCRIPTION

Referring now to the drawings:

In the illustrated preferred embodiment, an electronic thermometer housing 10, including a meter dial 11 and control knobs 12 and 13 is shown in FIG. 1 as being pivotally mounted to a tray 14 that forms the upper surface of a mobile unit, shown generally at 15. The mobile unit also includes legs 16 extending downwardly from each corner or tray 14 and terminating in caster wheels 17. Additional, spaced, shelves 18 and 19 interconnect and brace the legs and provide storage areas.

In FIG. 2, the housing 10 is shown mounted on the tray 14, but the tray is adapted to be hand carried.

Whether the housing 10 is mounted on the tray of a wheeled mobile unit or on a hand carried tray, it is preferably mounted to be freely rotatable about the vertical mounting axis. As best seen in FIG. 3, a bolt 21 is inserted through a ball bearing containing cup 22, the bottom 23 of housing 10 another ball bearing cup 24 and a washer 25, before having a nut 26 threaded thereon. The bolt then passes through the tray 14, a lock washer 27 and a wing nut 28, is threaded thereon. The wing nut allows for easy assembly of the housing and the tray, even without tools.

The engagement of the ball bearing in cups 22 and 24 with the bottom 23, allows free rotation of the housing about the longitudinal axis of bolt 21. The bottom of tray 14 is recessed upwardly at 29, so that the lock washer 27, wing nut 28 and the end of the bolt do not reach the bottom surface of the tray and, do not, therefore, affect the stability of the tray when it is placed on a flat surface, such as a table top. As an alternative to the recess 29, the tray can be provided with downwardly projecting legs that will support it in level fashion.

With the thermometer mounted to the tray a user can wheel or carry the tray to a patient's bedside and can also carry medicines or such other equipment as may be necessary for treatment of the patient. In many instances, patients will come to a central location where the thermometer can be used and the thermometer will need to be moved only infrequently. For such purpose, the thermometer can be left secured to a tray or it can be removed, by removing the wing nut 28 and lock washer 27, and it can then be suspended from a wall by eyelets 30, provided therefor on the rear of the housing 10 and corresponding hooks, not shown, secured to the wall. When not in use, the eyelets can be pivoted to be hidden behind housing 10.

In any event, when the unit is used, the thermometer probe 31 will be withdrawn from its receptacle 32 in the housing 10 and will be covered with a protective sheath 33, FIGS. 5 and 6, before the tip thereof is inserted into a patient's mouth or other suiitable body cavity and the sensed temperature is read on the meter 11. The manner in which body temperature is obtained is well known and is fully described in U.S. Pat. No. 3,367,186, issued Feb. 6, 1968, to John D. Ensign and David M. Allen and will not be described in detail here.

The probe 31 includes a ball tip 34, that can be of the types disclosed in U.S. Pat. 3,367,186 or in my aforementioned co-pending application, and that is connected to one end of a tube member 35 made of stainless steel or other suitable rigid or semi-rigid material. Tube member 35 fits into a larger tube 36 made of a magnetic material, and a stop 37 is provided at the end of tube 36 from which tube member 35 extends. The other end of tube 36 extends into a non-magnetic shoulder 38 that connects the tube 36 and one end of an electrical self-coiling cord 39 the other end of which is connected into a circuit, shown generally at 40 and positioned within the housing 10. The wires within cord 39 are connected through wires (not shown) within the probe to a thermally responsive resistance element in the tip 34.

A sheath retainer 41 is slidably mounted on tube 36 and is movable between stop 37 and shoulder 38 to facilitate testing of the disposable sheaths 33, as described in detail in my aforementioned application, Ser. No. 662,068.

Receptacle 32, FIG. 7, is made of a non-magnetic material such as aluminum, and is generally tubular in configuration. The receptacle is inserted into a hole provided therefor in the top housing 10 and is secured in place in any suitable fashion. A non-conductive, disposable liner 32a, made of waxed paper, or the like, can be placed in the receptacle and can be replaced, as required, for cleanliness purposes.

A permanent magnet 42 is fixed to the wall at the upper end of receptacle 32 and a switch 43 having a movable contact 44 of magnetic material is positioned opposite thereto. The switch is so positioned that the contact will normally be attracted by the magnet and will be pulled thereby into a closed position, engaging the fixed contact 45, whereby the circuit 40 will be energized and the meter dial 11 will be operated to indicate the temperature sensed at the ball tip 34, assuming of course, that main switch 45 in the circuit has already been closed.

The switch 43 will be held closed until such time as the probe 31 is inserted into the receptacle 32 and the magnetic tube portion 36 intercepts the magnetic lines of flux normally existing between the magnet 42 and the switch contact 44 through the liner 32a. The magnetic tube portion 36 intercepts and changes the direction of the lines of flux and the natural resiliency of the contact 44 moves it away from fixed contact 45.

The circuit 40 is thus rendered inoperable whenever the probe 31 is in the receptacle 32, but is immediately operative whenever it is removed and switch 45 has been previously closed. With the exception of the probe operated switch 43, circuit 40 is the same as that previously disclosed in U.S. Pat. No. 3,367,186 and its operation is therefore well known, and will not here be described in detail.

As has been noted, a sliding sheath retainer 41 is mounted to reciprocate along a portion of the probe length. This affords testing and securement of disposable sheaths 33, such as are disclosed in U.S. Pat. No. 3,349,-896, and greatly reduces the time and labor otherwise required to sterilize the probe between each usage.

A bag holder 50 is mounted on the same face of housing 10 as is the meter dial 11, so that the bag holder will swivel with the housing 10 and will at all times place a bag 51 containing the sheaths 33 conveniently available to a person utilizing the probe 31 to obtain a temperature reading.

As shown, one leg 52, FIG. 3, of the bag holder 50 is positioned beneath the meter dial 11 and is clamped between it and the housing 10 by screws 54. Another leg 55 of the holder then extends outwardly from the housing. One corner of leg 55, FIG. 4, adjacent to the housing 10 is notched, as at 56, and a notched extension 57 is provided along the edge of leg 55 outermost from the housing 10 and adjacent to a cut out portion 58 at the corner of the leg 55 diagonally opposite notch 56.

An elastic band 59, FIG. 5, is then slipped over the leg 55, and over a bag 51 containing sheaths 50 and is hooked into and is stretched between the notches to securely hold the bag in place.

Each bag 51 is preferably made of polyethylene or other suitable, impervious plastic material and is sealed around all of its edges. The bag has an overall length greater than the length of the probe 31, but intermediate its length it has a transverse seal 61 that extends from one side wall seam 60a partially across the bag, and that serves as a partition. A storage compartment is formed within the portion between one end seal 60b of the bag and the partition seal 61 and the compartment length is just sufficient to allow the sheaths 33 to fit therein, with their stretchable ends 33a adjacent to seam 61 and their open ends adjacent to the one end seam 60b. The portion of the bag between end seams 60b and 60d that is not divided by transverse seal 61 forms a fitting compartment for the sheaths 33. An upstanding wall 62 of the bag holder 50 extends from cut out portion 58 to adjacent the housing 10 and provides an abutment against which seam 61 will rest. The wall 62 thus helps hold the sheaths in position.

A notch 63 is provided in either of the edges of the bag adjacent end seal 60b or side seal 60c at their intersecting corners remote from the housing 10, when the bag is affixed to the bag holder 50, so that a diagonal pull on the corner will cause a corner thereof to tear off, with the tear starting at the notch 63. It should be noted that notch 63 does not extend through either of the seams 60b or 60c so the interior of the package will remain sterile after it has been sterilized prior to sealing until it is opened.

After the corner of the bag has been opened, the sheaths are individually moved from the storage compartment between the end seal 60b and the partition 61, by manipulation of the flexible bag, to the fitting compartment between end seals 60b and 60d. The semi-rigid portion 33b of the sheath is then held by the user manipulating his fingers on the top of the bag and on the bottom of the bag, through the cut out corner 58. The probe 31 is inserted through the corner opening in the bag and into the sheath. The sliding retainer 41 is pushed into the open end of the sheath while the stretchable end is stretched for test purposes and the retainer slides to stop 37 when the sheath is released and the stretchable portion 33a is relaxed.

The probe is withdrawn from the bag 51, with the sheath in place, and, if knob 13 has been previously operated to close switch 45, the unit is ready for operation.

With the present invention, an easily readable electronic thermometer is provided. The thermometer is adapted to be rendered immediately operable whenever its probe is withdrawn from a receptacle in the thermometer housing and disposable sheaths are at all times conveniently available to be installed on the probe in a highly sanitary manner. The probe sheath can be installed and used without ever having been touched by human hands.

Although not shown, it should be understood that a waste orifice could be provided in the trays 14 to receive disposable waste bags. Such combinations are well known, and it would be a matter of convenience to use them to facilitate disposal of the sheaths 33.

Although a preferred form of my invention has been herein disclosed, it is to be understood that variations are possible within the scope of the invention.

I claim:

1. An electronic thermometer unit comprising an electronic thermometer having
   a housing;
   a meter dial mounted on a face of the housing;
   a temperature responsive resistance probe;
   a circuit in the housing connected to the probe and the meter dial whereby resistance changes at the probe, responsive to temperature variations, are indicated on the meter dial;
   a tray;
   means mounting the housing to the tray whereby the thermometer can swivel with respect to the tray;
   a bag holder fixed to the housing and movable therewith;
   a bag containing disposable, stretchable sheaths adapted to fit over the resistance probe and a fitting compartment having compressible and expansible side walls whereby the sheaths can be stretched therein and can be gripped exteriorly thereof as the probe is inserted into the sheaths; and
   means for releasably securing the bag to the bag holder.

2. An electronic thermometer unit according to claim 1 wherein the bag is of flexible, impervious material having
   a seal around its entire outer edge, and
   a seal, intermediate its length and extending from one side wall to a point spaced from the opposite side wall whereby a storage compartment is provided having a length just sufficient to receive the sheaths in their relaxed state and a longer fitting compartment adapted to contain the sheaths in their stretched state.

3. An electronic thermometer unit as in claim 2, wherein the bag holder is fixed to the housing and includes
   a leg extending outwardly from the housing to receive the bag,
   diagonally opposed notches in the leg, adapted to receive an elastic member,
   an upstanding wall at one side of the leg, forming an abutment against which the ends of the sheaths in the storage compartment will rest, and
   a cut out portion in the leg, whereby sheaths in the fitting compartment can be grasped and held while the probe is inserted therein.

4. An electronic thermometer unit as in claim 3, wherein
   the housing further includes a receptacle therein to receive the probe; and
   a switch is fixed to said receptacle and is connected in the circuit, whereby insertion of the probe into the receptacle will open the switch and withdrawal of the probe will allow the switch to close, to thereby render the circuit operable.

5. An electronic thermometer unit as in claim 4, wherein a disposable liner is provided for the interior of the receptacle.

6. An electronic thermometer unit as in claim 4, wherein
   the receptacle has a permanent magnet fixed opposite the switch to hold the switch closed, and
   the probe has a magnetic portion adapted to be positioned between the magnet and the switch when the probe is fully inserted into the receptacle.

7. An electronic thermometer unit comprising
   a housing;
   a meter dial mounted on the face of the housing;
   a temperature responsive, resistance probe;
   a circuit means in the housing connected to the probe and the meter dial, whereby resistance changes at the probe, responsive to temperature variations, are indicated on the meter dial;
   an elongate, tubular and non-magnetic receptacle in the housing adapted to closely receive the probe; and
   normally closed magnetic switch means fixed to said receptacle and connected into the circuit means, whereby insertion of the probe into the receptacle will open the switch to thereby render the circuit means operable.

8. An electronic thermometer unit according to claim 7, wherein a disposable liner is provided for the interior of the receptacle.

9. An electronic thermometer unit according to claim 8, wherein
   the receptacle has a permanent magnet fixed opposite the switch to bias the switch closed; and
   the probe has a magnetic portion adapted to intercept lines of flux between the magnet and the switch when the probe is in the receptacle and to thereby allow the switch to open.

10. An electronic thermometer unit comprising
    a housing;
    a meter dial mounted on a face of the housing;
    a temperature responsive, resistance probe;
    a circuit in the housing, connected to the probe and the meter dial, whereby resistance changes at the probe, responsive to temperature variations, are indicated on the meter dial;
    a bag holder fixed to the housing; and
    a bag containing disposable sheaths, said bag being of flexible, impervious material, sealed around its periphery and having
        a seal intermediate its length dividing the bag into a storage compartment adapted to just receive disposable sheaths in their relaxed condition and an adjacent fitting compartment adapted to receive disposable sheaths in their stretched condition; and
        a notch in one corner adjacent to the fitting compartment; and
        means for releasably securing the bag to the bag holder.

11. An electronic thermometer unit as in claim 10 wherein the bag holder includes
    a leg projecting from the housing,
    an upstanding wall at one end of the leg, and
    a cut out portion at one corner of the leg adjacent to the wall.

References Cited

UNITED STATES PATENTS

| | | | |
|---|---|---|---|
| 2,474,899 | 7/1949 | Hutt | 200—61.58X |
| 2,566,017 | 8/1951 | Cooley | 335—205X |
| 2,611,836 | 9/1952 | Crawford | 200—61.58X |
| 2,673,252 | 3/1954 | Henrikson | 200—61.59X |
| 3,254,533 | 6/1966 | Tongret | 73—362 |
| 3,367,186 | 2/1968 | Ensign et al. | 73—362 |
| 3,377,862 | 4/1968 | Gheorghin | 73—362 |

LOUIS R. PRINCE, Primary Examiner

F. SHOON, Assistant Examiner

U.S. Cl. X.R.

73—362; 108—50, 94; 200—61.59; 206—16.5; 335—205